(12) United States Patent
Usui

(10) Patent No.: US 7,719,240 B2
(45) Date of Patent: May 18, 2010

(54) AC-DC CONVERTER

(75) Inventor: Hiroshi Usui, Niiza (JP)

(73) Assignee: Sanken Electric Co., Ltd., Niiza-shi (JP)

( * ) Notice: Subject to any disclaimer, the term of this patent is extended or adjusted under 35 U.S.C. 154(b) by 75 days.

(21) Appl. No.: 12/173,313

(22) Filed: Jul. 15, 2008

(65) Prior Publication Data

US 2009/0027930 A1  Jan. 29, 2009

(30) Foreign Application Priority Data

Jul. 23, 2007  (JP) .............................. 2007-191182

(51) Int. Cl.
*G05F 1/70* (2006.01)
(52) U.S. Cl. ...................... 323/206; 323/208
(58) Field of Classification Search ................. 323/207, 323/266, 208, 206
See application file for complete search history.

(56) References Cited

U.S. PATENT DOCUMENTS 5,960,207 A  9/1999  Brown 7,372,239 B2 *  5/2008  Kumagai et al. ............ 323/267

OTHER PUBLICATIONS

U.S. Appl. No. 12/173,489, filed Jul. 15, 2008, Usui.

* cited by examiner

*Primary Examiner*—Shawn Riley
(74) *Attorney, Agent, or Firm*—Oblon, Spivak, McClelland, Maier & Neustadt, L.L.P.

(57) ABSTRACT

An AC-DC converter includes a rectifier DB for rectifying an alternating current supplied from an alternating power source AC, a power factor controller 11 connected to an output side of the rectifier DB to improve a power factor, a DC-DC converter 12 that converts a voltage outputted from the power factor controller 11 to another voltage and also outputs either a power or a current limited to a predetermined value, a capacitor for storing an energy and a two-way converter 13 having one input/output terminals connected to output terminals of the DC-DC converter 12 and the other input/output terminals connected to the capacitor to carry out a two-way power conversion.

10 Claims, 11 Drawing Sheets

AC-DC CONVERTER

BACKGROUND OF THE INVENTION

1. Field of the Invention

The present invention relates to an AC-DC (alternate current-direct current) converter for converting alternating current to direct current. More particularly, the invention relates to a technique of reducing an input current in outputting a leak voltage.

2. Description of the Related Art

FIG. 1 shows a constitution of a conventional AC-DC converter disclosed in U.S. Pat. No. 5,960,207. The AC-DC converter includes a rectifier DB consisting of a diode bridge, an active power factor controller (PFC) 11, an input capacitor Cin and a DC-DC (direct current-direct current) converter (D/D) 12. The AC-DC converter operates as follows.

In operation, the rectifier DB rectifies AC power (85~265V) supplied from a commercial power source AC and outputs the full-wave rectified power to the power factor controller 11. If the power factor controller 11 is a type of global use, it boosts an output voltage of the rectifier DB to D.C. 380V. As a result, a voltage Vc on an input capacitor Cin of the DC-DC converter 12 connected to output terminals of the power factor controller 11 becomes D.C. 380V. Meanwhile, the power factor controller 11 allows the waveform of an input current to follow the waveform of an input voltage to improve a power factor of the AC-DC converter.

The DC-DC converter 12 inputs a D.C. voltage Vc supplied from the power factor controller 11 through the input capacitor Cin and further converts the voltage Vc to another D.C. voltage. The so-converted D.C. voltage (as an output voltage Vo) is supplied from output terminals +Tout, −Tout of the DC-DC converter 12 to a not-shown load.

SUMMARY OF THE INVENTION

Assuming that the power factor controller 11 of the above-mentioned conventional AC-DC converter has a conversion efficiency of 95%, while the DC-DC converter 12 has a conversion efficiency of 90, the whole conversion efficiency of the AC-DC converter becomes 85.5%. Here, it is noted that there is a limit in the current supplied through a normal plug outlet of the commercial power source AC, for example, 15 A at maximum in Japan. Therefore, in order to attain the input current from the commercial power source AC less than 15 A, a maximum output power under the regulated commercial power supply (e.g. A.C. 100V in Japan) has to be established less than a predetermined value (e.g. 100V×15 A×85.5%=1282. 5 Wat.). In other words, it means that the conventional AC-DC converter cannot cope with an electrical equipment (load) consuming a power exceeding 1282. 5 W.

In the meantime, an electrical equipment of recent date, for example, as high-speed printer is constructed so as to consume a great power at printing. This electric power consumption in the high-speed printer is apt to get larger as the printing speed is increased. As for a power unit for such a high-speed printer, there is an attempt to improve the conversion efficiency of the power unit, for the purpose of supplying the printer with a great power as possible, in view of its printing at a higher speed.

However, it should be noted that there is a limit in the improvement of conversion efficiency of the power unit and therefore, the attempt of increasing a power to be picked up is saturated recently. For speeding up of the printer in spite of the above situation, there would be required an exclusive commercial plug outlet or an installation for picking up a power through biserial commercial power lines, causing an increasing of troublesome tasks and the AC-DC converter to be expensive.

Under the above-mentioned situation, an object of the present invention is to provide an inexpensive AC-DC converter capable of acquiring an electrical power through a normal plug outlet of the commercial power source and also coping with a higher peak power on the side of an electrical load.

In order to solve the above-mentioned problem, according to a first aspect of the present invention, there is provided an AC-DC converter comprising: a rectifier for rectifying an alternating current supplied from an AC power source; a power factor controller connected to an output side of the rectifier to improve a power factor; a DC-DC converter that converts a voltage outputted from the power factor controller to another voltage and outputs either a power or a current limited to a predetermined value; a capacitor for storing an energy; and a two-way converter having one input/output terminals connected to output terminals of the DC-DC converter and the other input/output terminals connected to the capacitor to carry out a two-way power conversion.

According to a second aspect of the present invention, there is also provided an AC-DC converter comprising: a rectifier for rectifying an alternating current supplied from an AC power source; a power factor controller connected to an output side of the rectifier to improve a power factor and output either a power or a current limited to a predetermined value; a DC-DC converter that converts a voltage outputted from the power factor controller to another voltage; a capacitor for storing an energy; and a two-way converter having one input/output terminals connected to output terminals of the DC-DC converter and the other input/output terminals connected to the capacitor to carry out a two-way power conversion.

DETAILED DESCRIPTION OF THE PREFERRED EMBODIMENTS

Referring to drawings, various embodiments of the present invention will be described below, in detail.

1st. Embodiment

Figure 1:
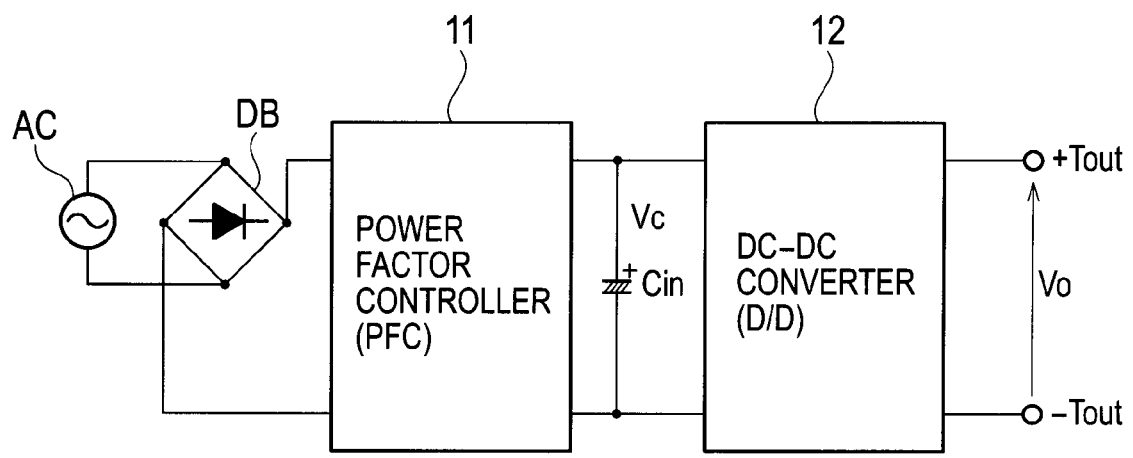
FIG. 1 is a view explaining a conventional AC-DC converter.
Figure 2:
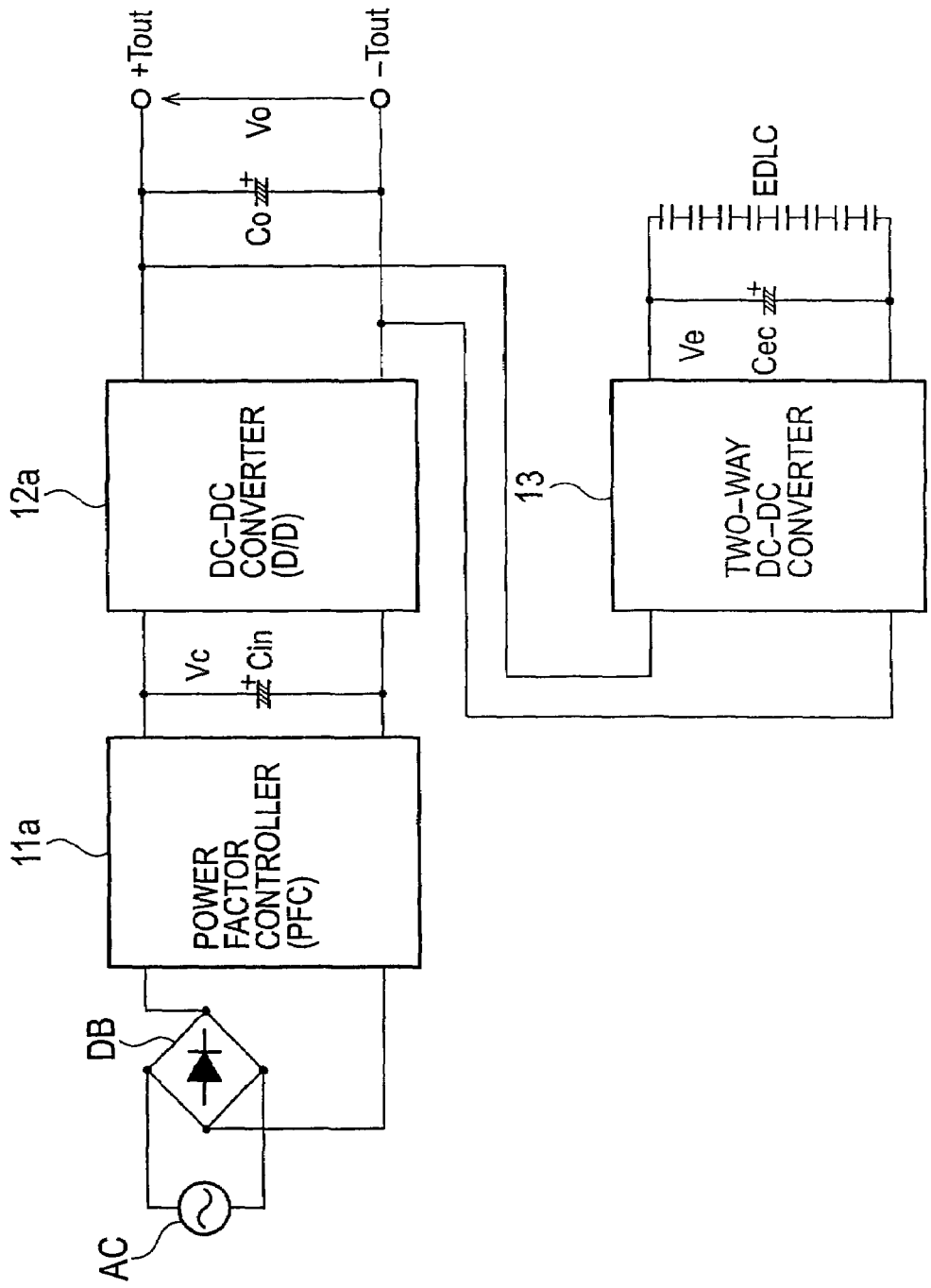
FIG. 2 is a view showing the constitution of an AC-DC converter in accordance with a first embodiment of the present invention.

FIG. 2 is a view showing the constitution of an AC-DC converter in accordance with the first embodiment of the present invention. Note, elements identical to constituents of the conventional AC-DC converter of FIG. 1 are indicated with the same reference numerals respectively and further, their overlapping descriptions are eliminated.

Besides the constituents of the conventional AC-DC converter of FIG. 1, the AC-DC converter of the first embodiment further includes an output capacitor Co, a two-way DC-DC converter 13, a smoothing capacitor Cec and an electric double layer capacitor EDLC. Again, the AC-DC converter includes a power factor controller 11a and a DC-DC converter 12a in place of the power factor controller 11 and the DC-DC converter 12 of the conventional converter, respectively.

The output capacitor Co is connected between output terminals of the DC-DC converter 12a. Both ends of the output capacitor Co are connected to output terminals +Tout, −Tout and also connected to input/output terminals (first input/output terminals) of the two-way DC-DC converter 13 on one side. Input/output terminals (second input/output terminals) of the two-way DC-DC converter 13 on the other side are connected in parallel with the smoothing capacitor Cec and the electric double layer capacitor EDLC. The electric double layer capacitor EDLC is formed by a plurality of cells (e.g. eight cells) connected in series, corresponding to a desired withstand voltage.

An output voltage Vo from the DC-DC converter 12a is supplied to a load through the output terminals +Tout, −Tout and also supplied to the first input/output terminals of the two-way DC-DC converter 13. The two-way DC-DC converter 13 has a two-way power converting function corresponding to a predetermined power conversion ratio. In detail, when a voltage at the first input/output terminals is higher than a voltage at the second input/output terminals adding a tinge of the predetermined power conversion ratio, the two-way DC-DC converter 13 converts the output voltage Vo supplied to the first input/output terminals to a voltage Ve and further outputs it from the second input/output terminals. Consequently, the smoothing condenser Cec and the electric double layer capacitor EDLC are recharged with electricity.

On the other hand, when the voltage at the first input/output terminals is lower than the voltage at the second input/output terminals adding a tinge of the predetermined power conversion ratio, the two-way DC-DC converter 13 converts the voltage Ve supplied from the electric double layer capacitor EDLC connected to the second input/output terminals and outputs the so-converted voltage through the first input/output terminals. Consequently, the above voltage outputted from the input/output terminals of the electric double layer capacitor EDLC is added to the output voltage Vo of the DC-DC converter 12a, so that the resultant voltage is outputted from the output terminals +Tout, −Tout.

Figure 3:
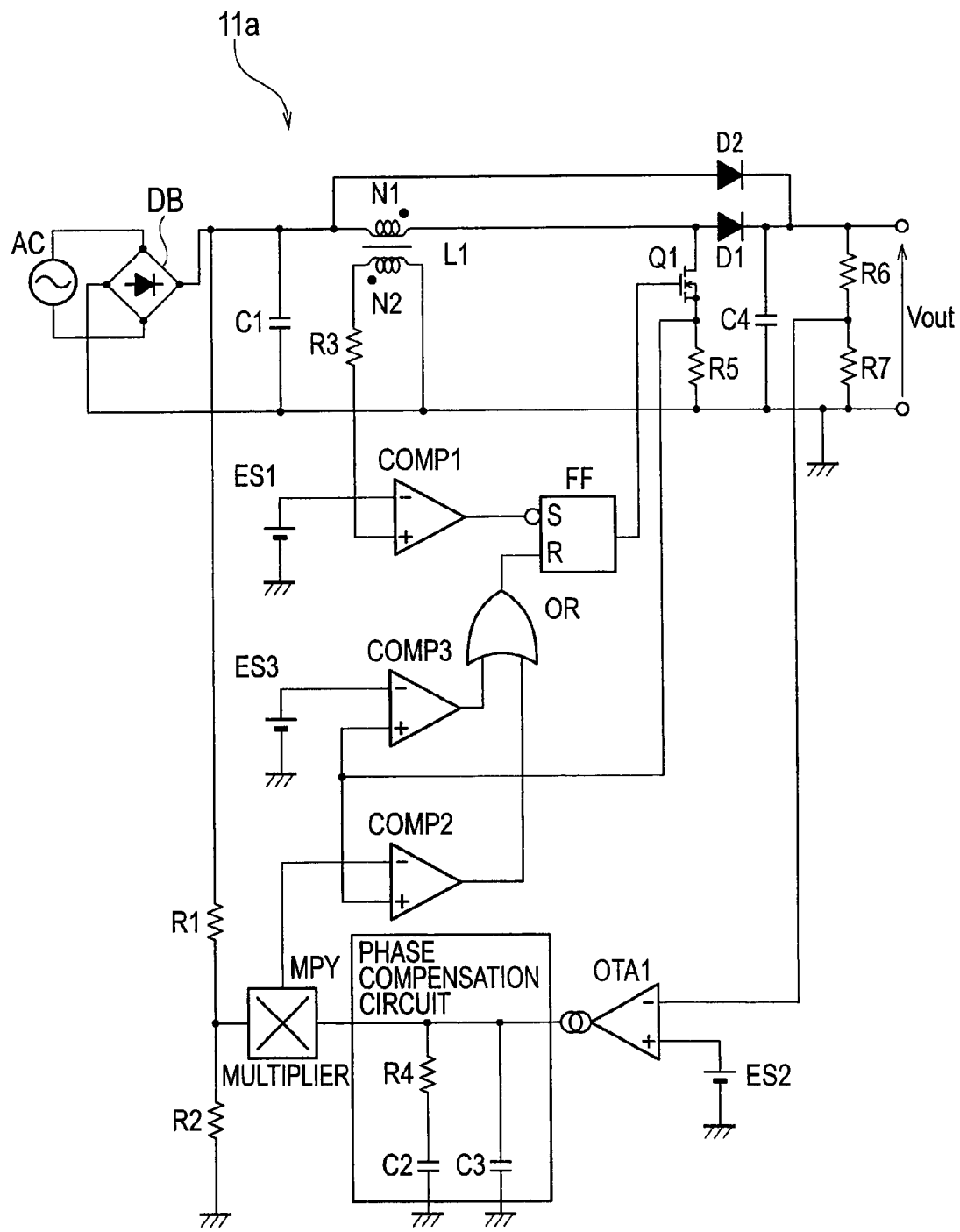
FIG. 3 is a circuitry diagram showing the detailed constitution of a power factor controller used in the AC-DC converter of the first embodiment of the present invention.

The power factor controller 11a outputs a current limited to a predetermined value (limited current Is). FIG. 3 is a circuitry diagram showing the detailed constitution of the power factor controller 11a. The power factor controller 11a is one operating in the critical mode. In a voltage obtained as a result of being full-wave rectified by the rectifier DB, its sinusoidal component is detected due to resistances R1, R2 and further inputted into one input terminal of a multiplier MPY. A capacitor C1 operates as a noise filter, while a diode D2 is a by-pass diode.

In the initial state, a flip-flop FF is set up and a switching element Q1 is turned ON. Consequently, a current from the rectifier DB flows through a primary winding N1 of a reactor L1, the switching element Q1 and a resistance R5. Then, the reactor L1 is charged with energy. An output voltage Vout is divided by resistances R6, R7 and further compared with a reference voltage ES2 at an operational amplifier OTA1 composed of a constant-current type conductive amplifier. An output from the operational amplifier OTA1 is inputted into the other input terminal of the multiplier MPY through a phase compensating circuit comprising a capacitor C3, a resistance R4 and a capacitor C2.

The multiplier MPY multiplies a voltage at the connection point between the resistance R1 and the resistance R2 by a voltage inputted from the operational amplifier OTA1 through the phase compensating circuit and further outputs a multiplication result as a target for a switching current to a comparator COMP2.

The switching current flowing through the switching element Q1 is detected as a voltage on both ends of the resistance R5 and compared with the target for the switching current by the comparator COMP2. When the switching current reaches the target, the flip-flop FF is reset by an OR (logical add) circuit OR, so that the switching circuit Q1 is turned OFF.

If the switching circuit Q1 is turned OFF, then the energy stored in the reactor L1 is superimposed on the input voltage and generated to an output capacitor C4 and the load (not shown) through a rectifying diode D1. Then, when the discharging of energy from the reactor L1 is completed, a voltage in a winding N2 of the reactor L1 is reversed. This reversal of voltage is detected since the comparator COMP1 compares the voltage with a reference voltage ES1. Consequently, the flip-flop FF is set up again, so that the switching element Q1 is turned ON. By repeating the above-mentioned operation, the improvement in power factor can be accomplished.

The power factor controller 11a has a function of limiting an output current. As mentioned above, the switching current for the switching element Q1 is detected as the voltage on both ends of the resistance R5 and further compared with a reference voltage ES3 by a comparator COMP3. If the voltage on both ends of the resistance R5 equivalent to the switching current gets larger than the reference voltage ES3, then the flip flop FF is reset by the OR circuit OR, so that the switching element Q1 is turned OFF. Thus, a peak value of the switching current is limited to the reference voltage ES3.

According to the power factor controller 11a constructed above, if the load gets increased, then the output current from the power factor controller 11a is suppressed to cause a limit on the input current from the commercial power source AC. Assume, for instance, the power factor controller 11a has a conversion efficiency of 95%. Then, in order to prevent an input current from exceeding 15 A under the input of AC100V, an output limiting current $I_S$ from the power factor controller 11a is set to 3.75 A (=AC 100V×15 A×95%÷380 V). With this establishment of output limiting current $I_S$, it is possible to limit the input current to 15 A irrespective of loads.

Meanwhile, it is noted that high-speed printer consumes a fifth part of a peak power on the average although it consumes a great power during printing. Thus, on condition that a load such as the high-speed printer is connected to the AC-DC converter, a current would reach the above output limiting current $I_S$ only in the printing operation. Once the current reaches the output limiting current $I_S$, the power factor controller 11a is controlled so as to output a reduced voltage.

The output voltage of the DC-DC converter 12a connected to the output of the power factor controller 11a is reduced as its output voltage decrease. In the situation, there arises an energy supply from the electric double layer capacitor EDLC connected to the second input/output terminals of the two-way DC-DC converter 13, so that a power is outputted from the first input/output terminals of the converter 13. In this way, the load can be supplied with the power corresponding to both capabilities of the two-way DC-DC converter 13 and the electric double layer capacitor EDLC.

Thus, even if a power exceeding 15 A in terms of the input current from the commercial power AC is to be consumed by the load, the peak power could be supplemented by the electric double layer capacitor EDLC while maintaining the input current from the commercial power AC less than 15 A. Note, the charging against the electric double layer capacitor EDLC is carried out during the period where the high-speed printer is not printing.

As mentioned above, according to the AC-DC converter of the first embodiment, it is possible to supply the high-speed printer with a greater peak power while restraining the input current from the commercial power AC less than 15 A. Therefore, there is no need of providing an exclusive commercial plug outlet or an installation for picking up power from the two-line commercial power line, dissolving problems of troublesome task and a high-priced AC-DC converter.

Figure 4:
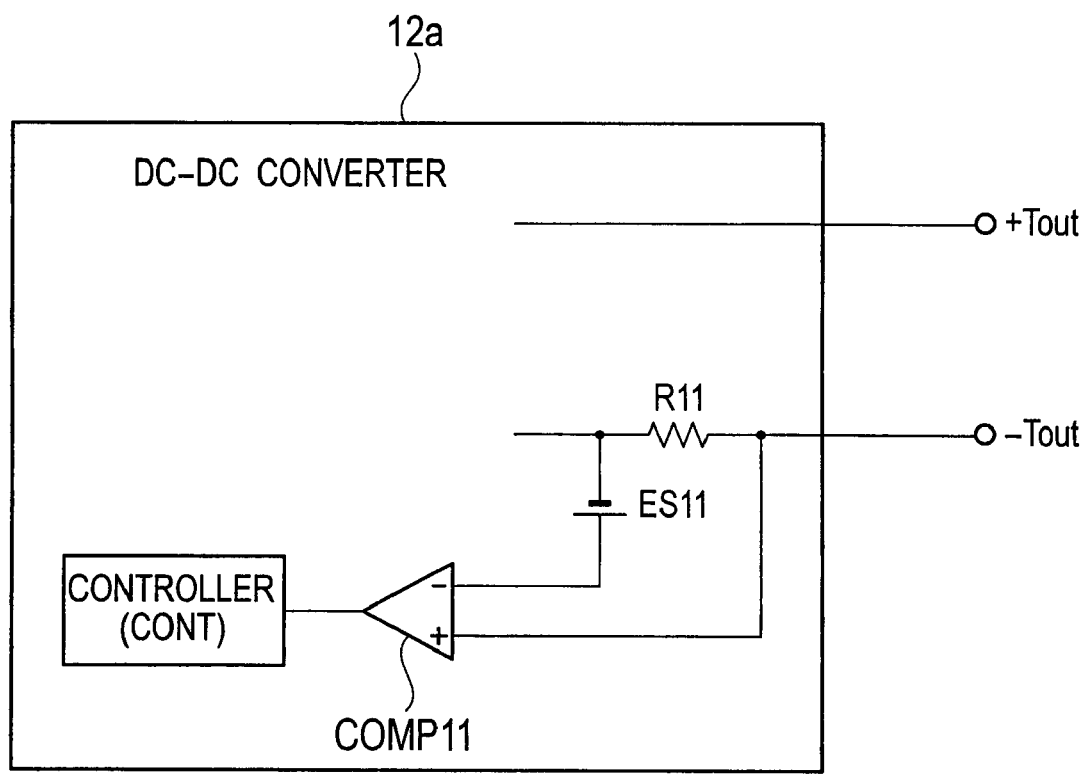
FIG. 4 is a circuitry diagram showing the constitution of an essential part of the DC-DC converter used in the AC-DC converter of the first embodiment of the present invention.

Although the AC-DC converter of the first embodiment is provided with the power factor controller 11a having a function of limiting the output current, the DC-DC converter 12a may be provided with the same function instead. In this case, as shown in FIG. 4, a current-detection resistance R11 is interposed in the output terminal of the DC-DC converter 12a, while a comparator COMP11 is provided to compare a voltage obtained from a current flowing through the resistance R11 with a predetermined reference voltage ES11 generated in a voltage source.

The comparator COM11 outputs a comparison result to a controller CONT. If a signal from the comparator COM11 represents that the voltage generated in the current-detection resistance R11 is larger than the reference voltage ES11, in other words, the output current from the DC-DC converter 12a is larger than an output limiting current $I_{Sd}$, then the controller CONT shortens an ON period of a not-shown switching element in order to limit the output current. Consequently, it is possible to realize the similar effect to the above-mentioned situation to limit the output current on the side of the power factor controller 11a.

$2^{nd}$. Embodiment

Figure 5:
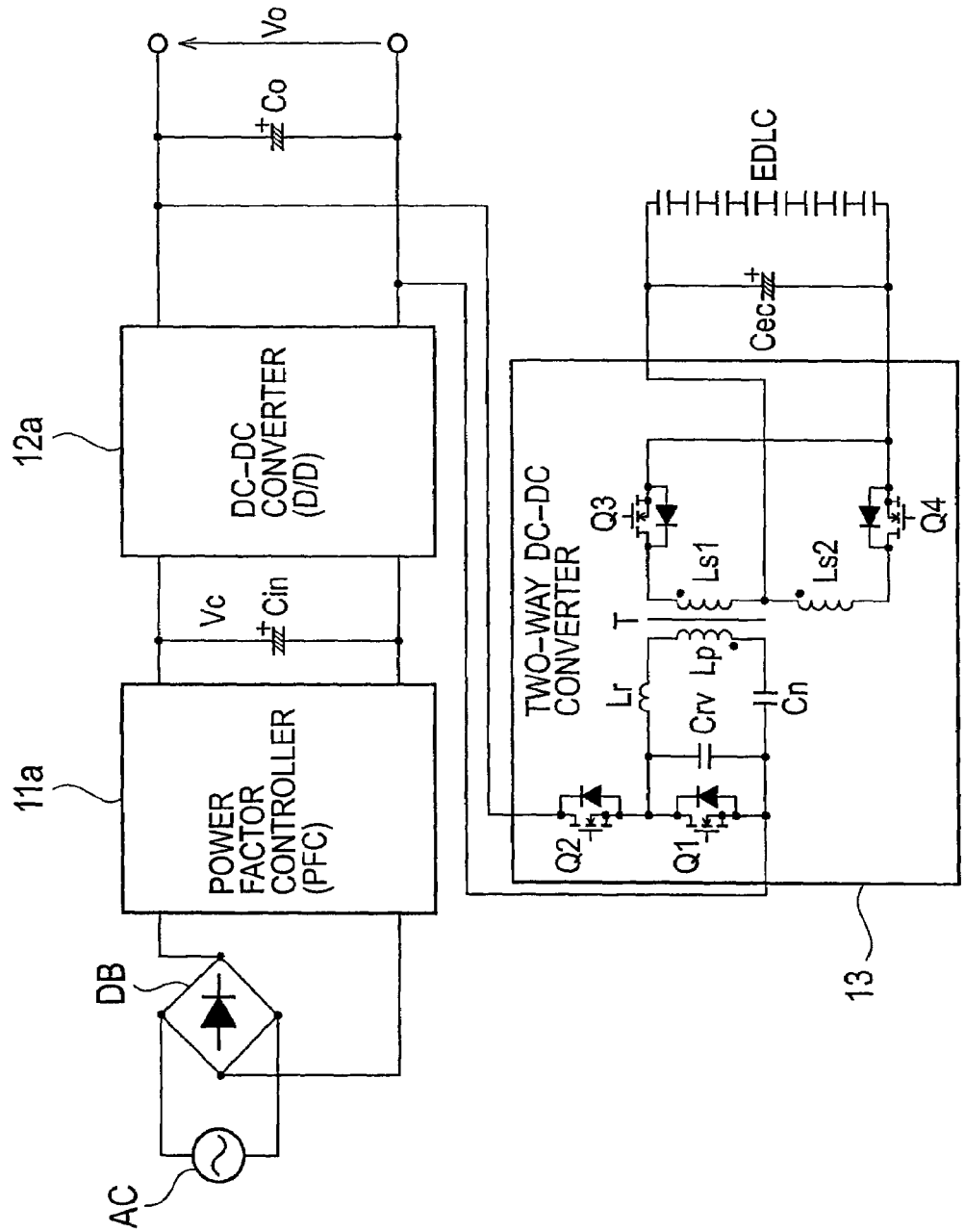
FIG. 5 is a view showing the constitution of an AC-DC converter in accordance with a second embodiment of the present invention.

According to the second embodiment of the present invention, the two-way DC-DC converter 13 of the first embodiment shown in FIG. 2 is embodied. FIG. 5 is a block diagram showing the constitution of the AC-DC converter of the second embodiment. Note, constituents identical to those of the AC-DC converter of the first embodiment are indicated with the same reference numerals and their descriptions are eliminated. We now explain differences from the first embodiment, that is, only the constitution of the two-way DC-DC converter 13.

In the two-way DC-DC converter 13, its primary side comprises a half bridge current resonant circuit having a switching element Q1 and a switching element Q2, while the secondary side comprises a synchronous rectification type both-wave rectifier circuit having a switching element Q3 and a switching element Q4. In the two-way DC-DC converter 13, the switching elements Q1, Q4 are operated simultaneously with each other, while the switching elements Q2, Q3 are also operated simultaneously with each other. In this way, these switching elements are controlled so as to turn ON/OFF with respective dead times alternately.

On the primary side of a transformer T, there are the first switching element Q1 and the second switching element Q2 which are connected in series between the first input/output terminals and on which a voltage (output voltage Vo) on both ends of the output capacitor Co is applied, a voltage pseudo-resonance capacitor Crv connected in parallel with the first switching element Q1 and a series resonance circuit connected with both ends of the voltage pseudo-resonance capacitor Crv. In the series resonance circuit, a primary winding Lp of the transformer T, a resonance reactor Lr and a current resonance capacitor Cri are connected in series. Note, the resonance reactor Lr may be provided by a leakage inductance of the transformer T.

On the secondary side of the transformer T, there are a first secondary winding Ls1 and a second secondary winding Ls2 both of which are wound so as to generate a voltage having a reversed phase against the voltage of the primary winding Lp of the transformer T. A connection point between the first secondary winding Ls1 and the second secondary winding Ls2 forms one of the second input/output terminals, while a signal line extending from the first secondary winding Ls1 via the switching element Q3 is connected to a signal line extending from the second secondary winding Ls2 via the switching element Q4 to form the other of the second input/output terminals. Respective ON/OFF states in the first to the fourth switching elements Q1 to Q4 are controlled by a not-shown controller.

In the so-constructed two-way DC-DC converter 13, a LC resonant current flows through the series resonance circuit on the primary side of the transformer T. Further, an exciting current of the transformer T is superimposed on the LC resonant current. In each of the switching elements Q1 to Q4, a current flows in one half-cycle of the LC resonance frequency. Accordingly, the current during the switch ON substantially reaches zero but the exciting current only. The exciting energy by the exciting current is stored in the transformer T and produces a voltage pseudo-resonance after each of the switching elements is turned OFF, providing a voltage pseudo-resonance waveform due to an inductance of the transformer T and the voltage pseudo-resonance capacitor Crv. Each switching element has an on-time at a constant frequency where a dead time of the voltage pseudo-resonance period is added to one half cycle of the LC resonance frequency.

As mentioned above, according to the second embodiment of the present invention, the AC-DC converter can accomplish a high conversion efficiency with the realization of zero-current switching and zero-voltage switching.

$3^{rd}$. Embodiment

According to the third embodiment of the present invention, the two-way DC-DC converter 13 of the first embodiment shown in FIG. 2 is embodied by a different circuit from that of the second embodiment.

Figure 6:
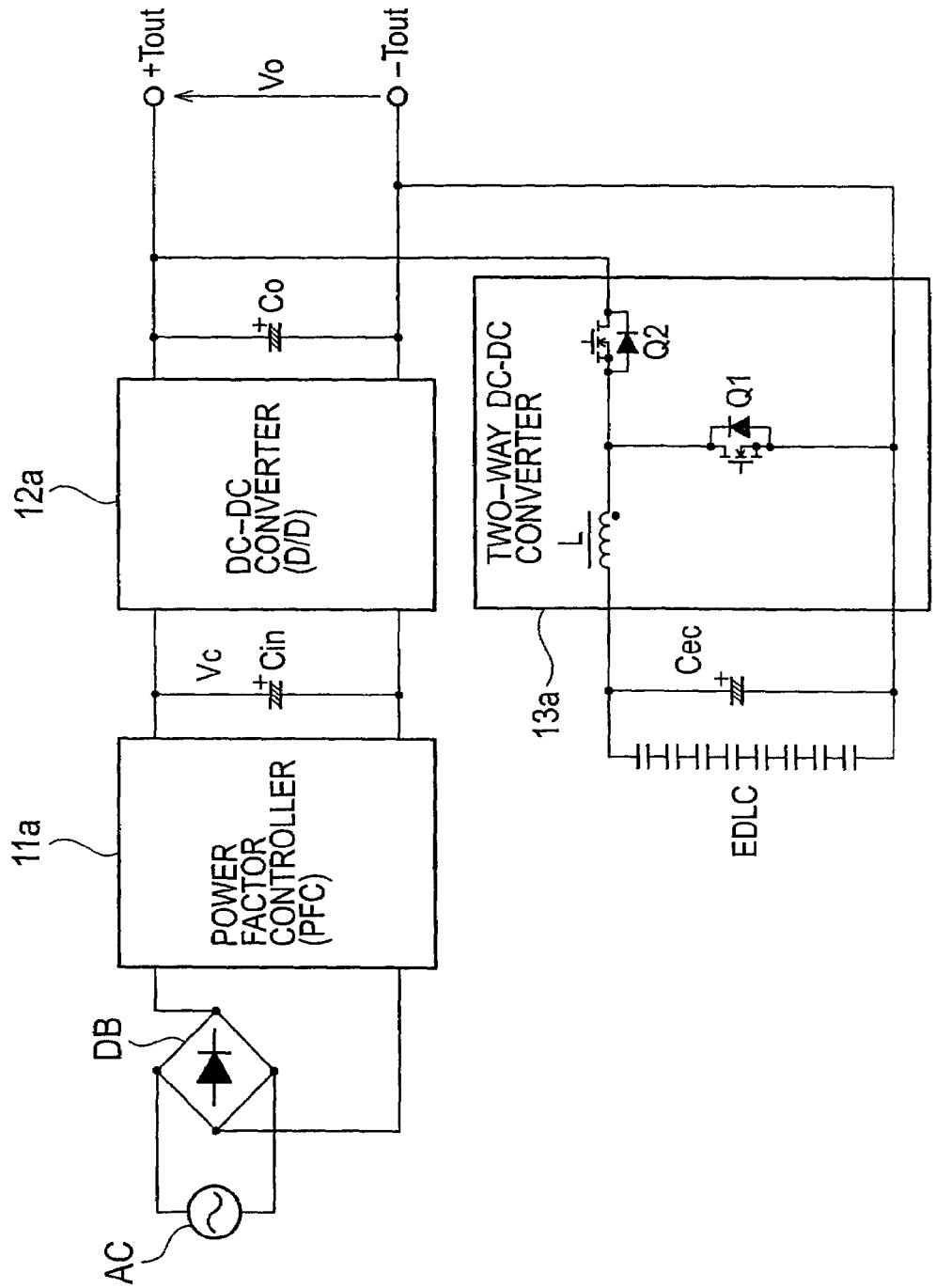
FIG. 6 is a view showing the constitution of an AC-DC converter in accordance with a third embodiment of the present invention.

FIG. 6 is a block diagram showing the constitution of the AC-DC converter of the third embodiment. Note, constituents identical to those of the AC-DC converter of the first embodiment are indicated with the same reference numerals and their descriptions are eliminated. We now explain differences from the first embodiment, that is, only the constitution of the two-way DC-DC converter 13a.

The two-way DC-DC converter 13a is formed by a boost type chopper circuit comprising a switching element Q1, a switching element Q2 and a reactor L. That is, the switching element Q1 and the switching element Q2 are connected in series between the first input/output terminals of the two-way DC-DC converter 13a. In the switching element Q1, one terminal forms one of the second input/output terminals through the reactor L, while the other terminal forms the other of the second input/output terminals.

Assume, in the AC-DC converter of the third embodiment, the power factor controller 11a has a conversion efficiency of 95%. Then, in order to prevent an input current from exceeding 15 A under the input of AC 100V, the output limiting current $I_S$ from the power factor controller 11a is set to 3.75 A (=AC 100V×15 A×95%÷380V). Further, if the DC-DC converter 12a has a conversion efficiency of 95% and an output of DC 24V, then the output limiting current $I_{Sd}$ from the DC-DC converter 12a is set to 53.4 A (=AC 100V×15 A×95%× 90%÷24V).

As mentioned above, according to the third embodiment of the present invention, it is possible to limit the input current to 15 A irrespective of loads due to the above establishment of limited current $I_{Sd}$. Additionally, when the load requires a great peak power, the energy is supplied from the electric double layer capacitor EDLC, so that the load is supplied with a boosted output voltage Vo. Thus, the similar effect to that of the AC-DC converter of the first embodiment can be realized in this embodiment.

4$^{th}$. Embodiment

According to the fourth embodiment of the present invention, the two-way DC-DC converter 13 of the first embodiment shown in FIG. 2 is embodied by a different circuit from those of the second and the third embodiments.

Figure 7:
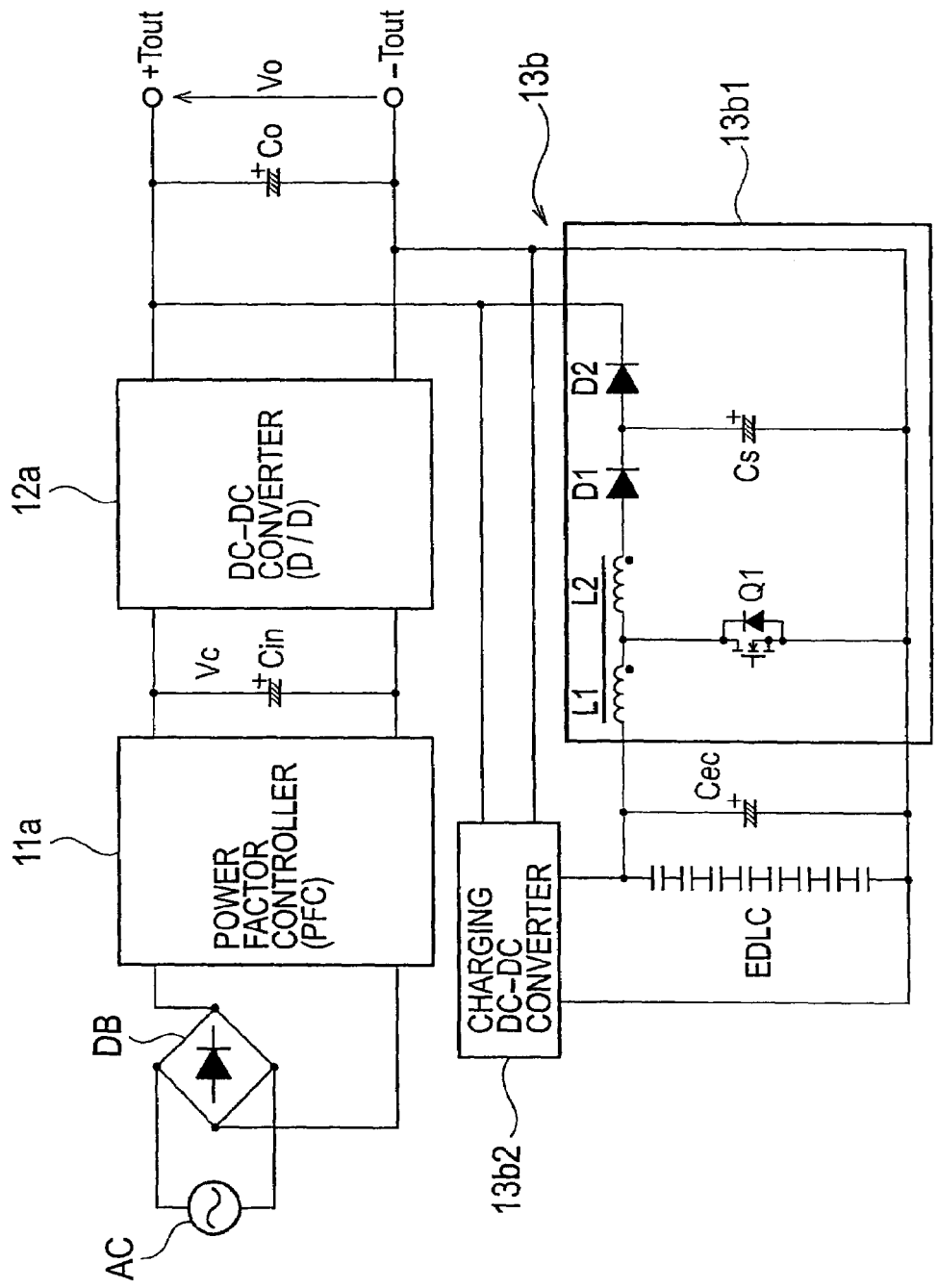
FIG. 7 is a view showing the constitution of an AC-DC converter in accordance with a fourth embodiment of the present invention.

FIG. 7 is a block diagram showing the constitution of the AC-DC converter of the fourth embodiment. Note, constituents identical to those of the AC-DC converter of the first embodiment are indicated with the same reference numerals and their descriptions are eliminated. We now explain only a two-way DC-DC converter 13b which is different from that of the first embodiment. The two-way DC-DC converter 13b comprises a boost type DC-DC converter 13b1 composed of one-way boost type chopper circuit and a charging DC-DC converter 13b2.

In the shown embodiment, the charging DC-DC converter 13b2 has input terminals connected to the output terminals of the DC-DC converter 12a. However, the input terminals of the charging DC-DC converter 13b2 may be connected to the input/output terminals of the DC-DC converter 12a or the input/output terminals of the power factor controller 11a.

The boost type DC-DC converter 13b1 comprises reactors L1, L2 in the form of a transformer, a switching element Q1, a rectifying diode D1, an output capacitor Cs and an anti-backflow diode D2. The reason of employing the reactors L1, L2 in the form of a transformer is that the two-way DC-DC converter 13b is required to have a relatively-high boost ratio whereas the voltage of the electric double layer capacitor EDLC is generally low. Thus, the reactor L2 may be eliminated depending on the application.

The diode D2 prevents a backflow of current and maintains the voltage of the output capacitor Cs in order to prevent a standstill of the boost type DC-DC converter 13b1 under unloaded condition. The reason of maintaining the boost type DC-DC converter 13b1 in operation is that if it is suspended, it would take a long time to begin the operation of the converter 13b1. Therefore, if voltage of the output capacitor Co becomes lower than the voltage of the output capacitor Cs, then current automatically flows out through the diode D2 to supply the load with energy.

The charging DC-DC converter 13b2 is controlled so as to charge the electric double layer capacitor EDLC during the period where the boost type DC-DC converter 13b1 is not feeding a peak power to the load.

As mentioned above, the similar effect to that of the AC-DC converter of the first embodiment can be realized in this embodiment.

In common with the first to the fourth embodiments, the AC-DC converter is constructed so as to limit the output current of the power factor controller 11a or the output current of the DC-DC converter 12a to a predetermined value (i.e. the output limiting current). In the modification, the AC-DC converter may be constructed so as to limit the output power in place of the output current.

5$^{th}$. Embodiment

According to the fifth embodiment of the present invention, the AC-DC converter includes a DC-DC converter 12b to control its output voltage. In detail, the DC-DC converter 12b is adapted so as to apply a feedback control on an output voltage detected by an output voltage detecting circuit, with a delay of a predetermined time since an occurrence of a peak load. We now describe only the DC-DC converter 12b.

Figure 8:
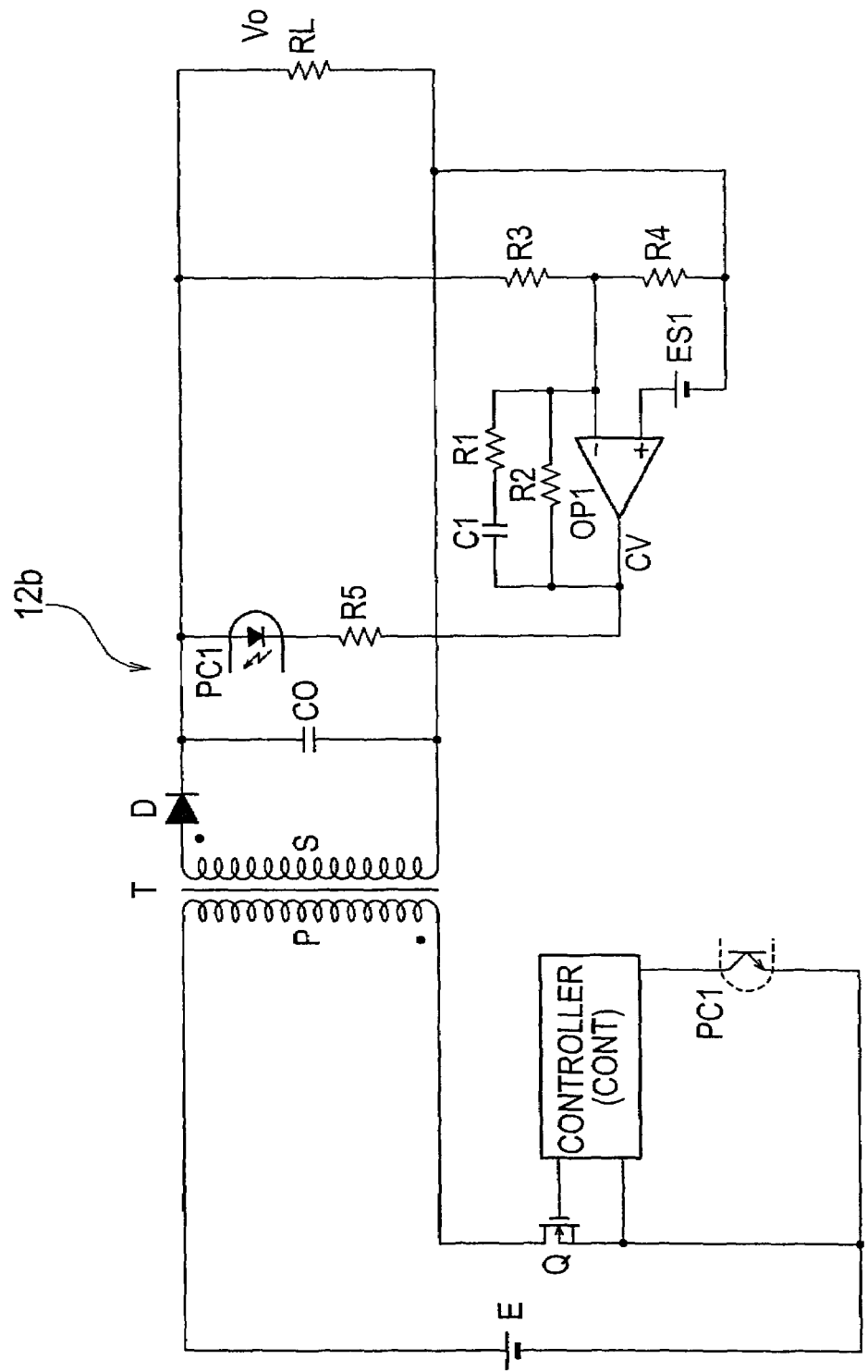
FIG. 8 is a circuitry diagram showing the detailed constitution of a DC-DC converter used in an AC-DC converter in accordance with a fifth embodiment of the present invention.
Figure 9:
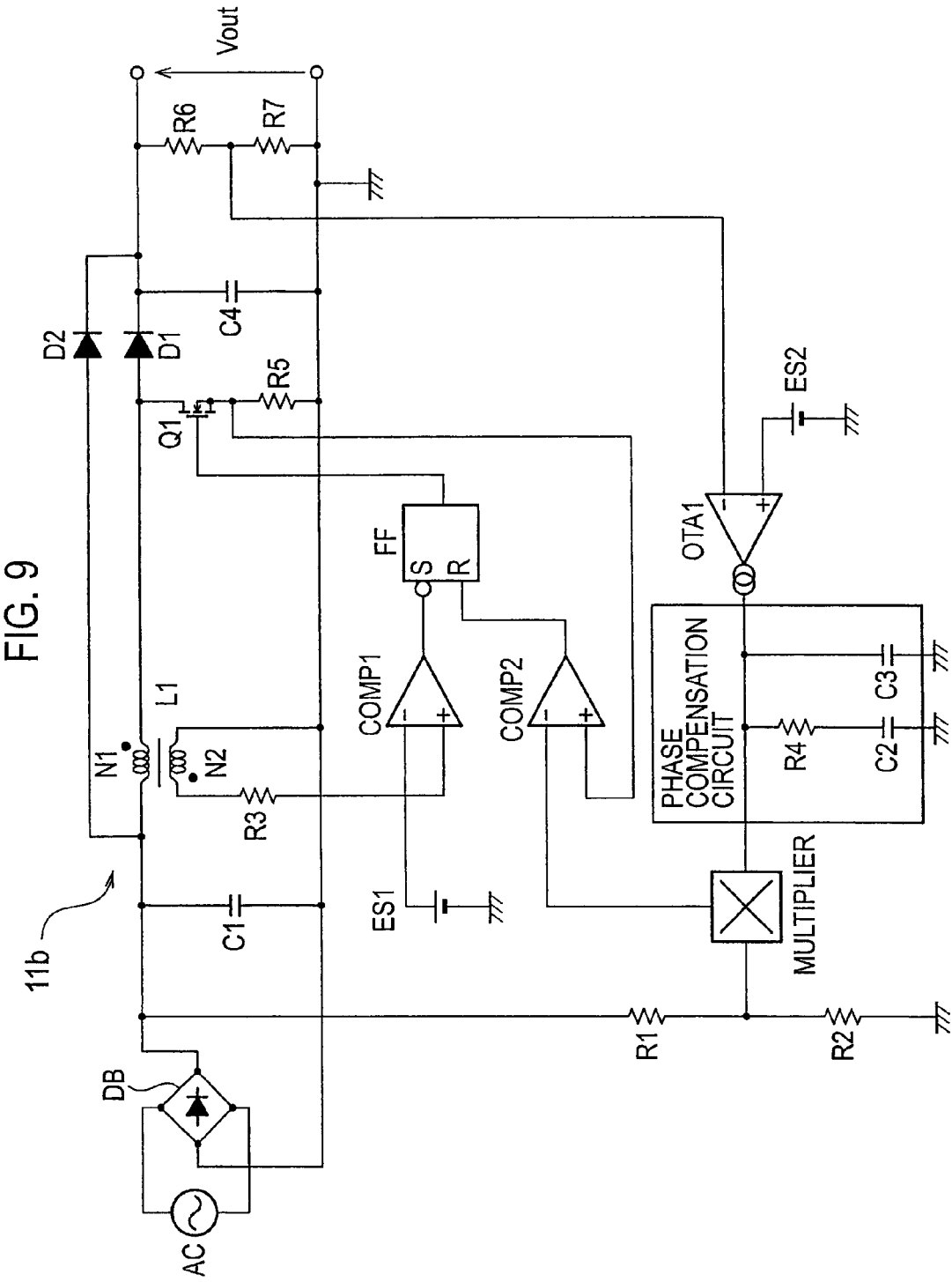
FIG. 9 is a circuitry diagram showing the detailed constitution of a power factor controller used in an AC-DC converter of a sixth embodiment of the present invention.

FIG. 8 is a circuitry diagram showing the detailed constitution of the DC-DC converter 12b in the AC-DC converter of the fifth embodiment. The DC-DC converter 12b, which is a type of flyback converter, adopts an output of the power factor controller 11 as a power source E. On the primary side of the DC-DC converter 12b, there is a series circuit composed of a primary winding P of a transformer T and a switching element Q. This series circuit is connected in parallel with the power source E. A controller CONT is provided to control the turning ON/OFF of the switching element Q.

On the secondary side of the DC-DC converter 12b, there is a series circuit composed of a rectifying diode D and a smoothing capacitor CO, which is connected in parallel with a secondary winding S of the transformer T. A load RL is supplied with an output voltage Vo from both ends of the smoothing capacitor CO. On the secondary side of the DC-DC converter 12b, additionally, there is an output voltage detecting circuit CV having resistances R1 to R4, a capacitor C1, an operational amplifier OP1 and a voltage source for generating a reference voltage ES1.

In the output voltage detecting circuit CV, the resistance R3 and the resistance R4 are connected in series with each other between both ends of the smoothing capacitor CO. A connection point between the resistances R3 and R4 is connected to an inverting input terminal (−) of the operational amplifier OP1. While, a noninverting input terminal (+) of the operational amplifier OP1 is supplied with the reference voltage ES1 from the voltage source. The resistance R2 is connected between the inverting input terminal (−) of the operational amplifier OP1 and its output terminal. A series circuit composed of the resistance R1 and the capacitor C1 is connected in parallel with the resistance R2.

The output terminal of the operational amplifier OP1 is connected to a photo coupler PC1 through a current limiter resistance R5. When the output from the operational amplifier OP1 becomes a low level, in other words, if it is detected that the output voltage Vo has exceeded a predetermined voltage determined by the reference voltage ES1, then the photo coupler PC1 transmits such a situation to the controller CONT. In succession, the controller CONT controls an ON-period of the switching element Q to hold the output voltage Vo at a predetermined value.

As for the above-constructed DC-DC converter 12b, we now explain an operation of feeding the output voltage detected by the output voltage detecting circuit CV back to the primary side of the transformer T with a delay of a predetermined time since a leak load has occurred. In the output voltage detecting circuit CV, a gain A of the operational amplifier OP1 is represented by an equation of A=Rf/Rs where Rs is a combined resistance of R3 and R4, while Rf is determined by the resistance R1, the capacitor C1 and the resistance R2. Accordingly, it is carried out to determine a damping time constant of the circuit composed of the capacitor C1 and the resistance R1 in order that the output of the operational amplifier OP1 is delayed behind the peak load by a predetermined time. Consequently, even if the power to be supplied to the electrical load reaches a peak, the DC-DC converter 12b would not respond such a situation immediately, so that the output voltage is lowered. As a result, it becomes possible for the electric double layer capacitor EDLC to supply the electrical load with energy through the two-way converter 13.

As mentioned above, according to the AC-DC converter of the fifth embodiment, it is possible to form the DC-DC converter 12b and the power factor controller 11a by small converters incompatible for a leak load.

6$^{th}$. Embodiment

According to the sixth embodiment of the present invention, the AC-DC converter includes a power factor controller 11b to control its output voltage. In detail, the power factor controller 11b is adapted so as to feed an output voltage detected by the output voltage detecting circuit back to the primary side of the controller 11b, with a delay of a predetermined time since an occurrence of a peak load. We now describe only the power factor controller 11b.

The power factor controller 11b of the sixth embodiment can be obtained by eliminating the comparator COMP3, the source of the reference voltage ES3 and the OR circuit OR from the power factor controller 11a of the first embodiment (FIG. 3). That is, the power factor controller 11b is constructed so that the output of the comparator COMP2 is inputted to a reset terminal R of the flip-flop FF directly. The output voltage detecting circuit is formed by the resistances R6, R7 and the operational amplifier OTA1.

As for the above-constructed power factor controller 11b, we now explain an operation of feeding the output voltage detected by the output voltage detecting circuit back to the primary side of the transformer T with a delay of a predetermined time since a leak load has occurred.

A constant-current type conductive amplifier is adopted as the operational amplifier OTA1 in the output voltage detecting circuit (in view of serving both as CV and OV). Of course, the operational amplifier OTA1 may be formed by a normal operational amplifier. In the conductive amplifier, its gain is generally determined by an internal circuit constant. Thus, only a phase response is determined by the resistance R4, the capacitor C2 and the capacitor C3 all constituting an external phase compensating circuit.

Thus, the response time can be determined by an outflow current of the operational amplifier OTA1 and a damping time constant of the CR circuit forming the phase compensating circuit. Accordingly, it is carried out to determine a damping time constant of the circuit composed of the resistance R4 and the capacitors C2 and C3 in order that the output of the operational amplifier OTA1 is delayed behind the peak load by a predetermined time. Consequently, even if the power consumption of the electrical load reaches a peak, the power factor controller 11b would not respond such a situation immediately, so that the output voltage is lowered. As a result, it becomes possible for the electric double layer capacitor EDLC to supply the electrical load with energy through the two-way converter 13.

As mentioned above, according to the AC-DC converter of the sixth embodiment, it is possible to form the DC-DC converter 12b and the power factor controller 11b by small converters incompatible for the leak load.

7$^{th}$. Embodiment

Figure 10:
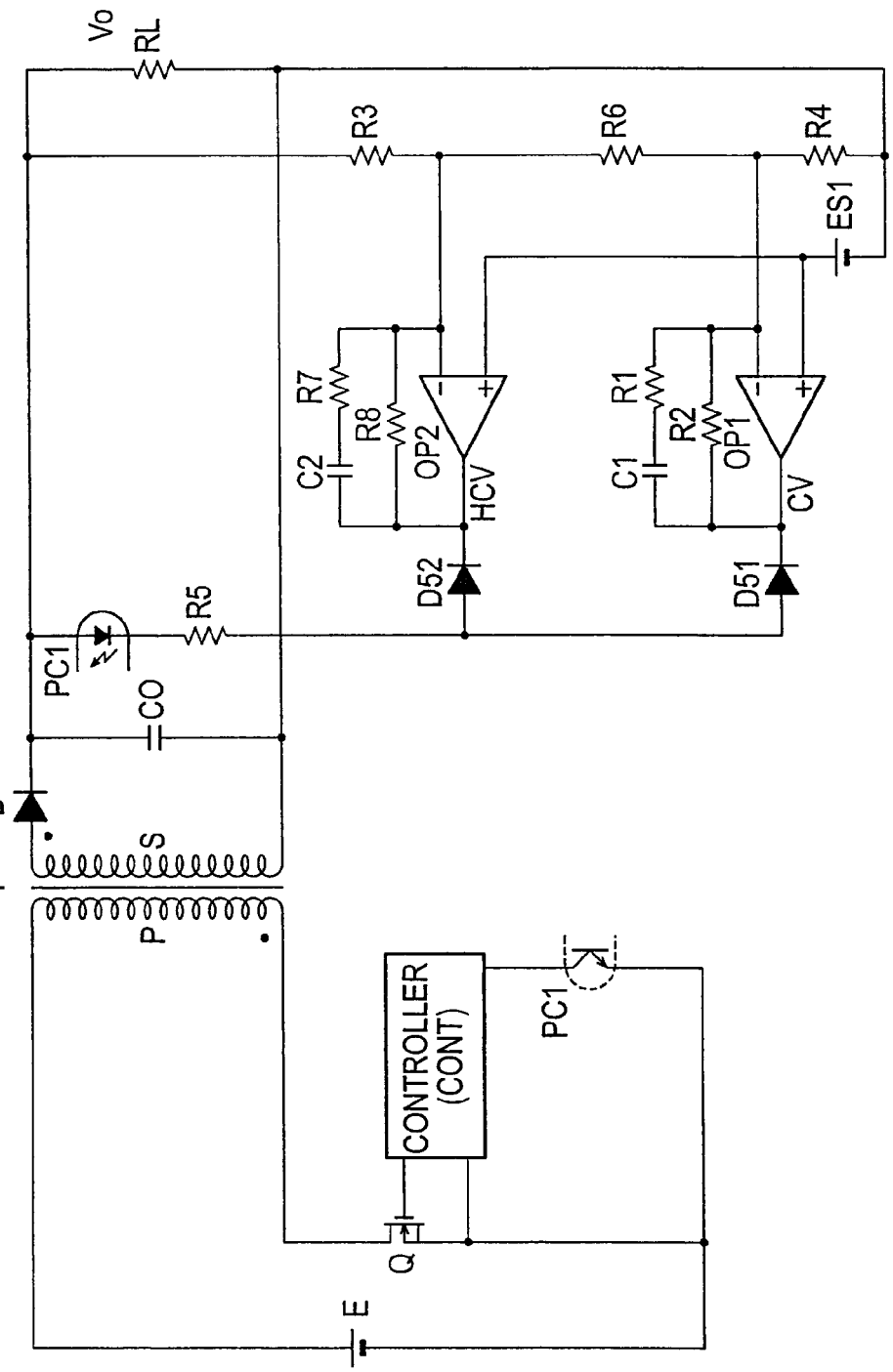
FIG. 10 is a circuitry diagram showing the detailed constitution of a DC-DC converter used in an AC-DC converter in accordance with a seventh embodiment of the present invention.

According to the seventh embodiment of the present invention, the AC-DC converter includes a DC-DC converter 12c. As shown in FIG. 10, the DC-DC converter 12c of the seventh embodiment can be obtained by adding a resistance R6 in between the resistance R3 and the resistance R4 on the secondary side of the DC-DC converter 12b of the fifth embodiment and further adding a diode D51 in between the output voltage detecting circuit CV and the current limiter resistance R5. The DC-DC converter 12c further includes a high-speed responsive output voltage detecting circuit HCV comprising resistances R7, R8, a capacitor C2 and an operational amplifier OP2, and another diode D52 interposed between the circuit HCV and the current limiter resistance R5.

In the high-speed responsive output voltage detecting circuit HCV, a connection point between the resistance R3 and the resistance R6 is connected to an inverting input terminal (−) of the operational amplifier OP2. While, a noninverting input terminal (+) of the operational amplifier OP2 is supplied with the reference voltage ES1. The resistance R8 is connected between the inverting input terminal (−) of the operational amplifier OP2 and its output terminal. A series circuit composed of the resistance R7 and the capacitor C2 is connected in parallel with the resistance R8. The output terminal of the operational amplifier OP2 is connected to a photo coupler PC1 through the diode D52 and the current limiter resistance R5.

In the above-mentioned AC-DC converter of the seventh embodiment, its output voltage has a tendency to be reduced when the electrical load gets larger rapidly since the responsibility of the DC-DC converter 12c is lowered. Even when the voltage is lowered in the above way, there arises no problem since the two-way DC-DC converter 13 operates to supply energy. However, if the electrical load eases up rapidly, then the output voltage is boosted up remarkably. In order to prevent this elevation in output voltage, the high-speed responsive output voltage detecting circuit HCV is responsive to a voltage somewhat larger (larger by only a predetermined value) than an output voltage Vo generated by the resistance R6 at a high speed.

As mentioned above, according to the AC-DC converter of the seventh embodiment of the present invention, it is possible to prevent the output voltage from being remarkably boosted by a rapidly-eased electrical load.

8$^{th}$. Embodiment

Figure 11:
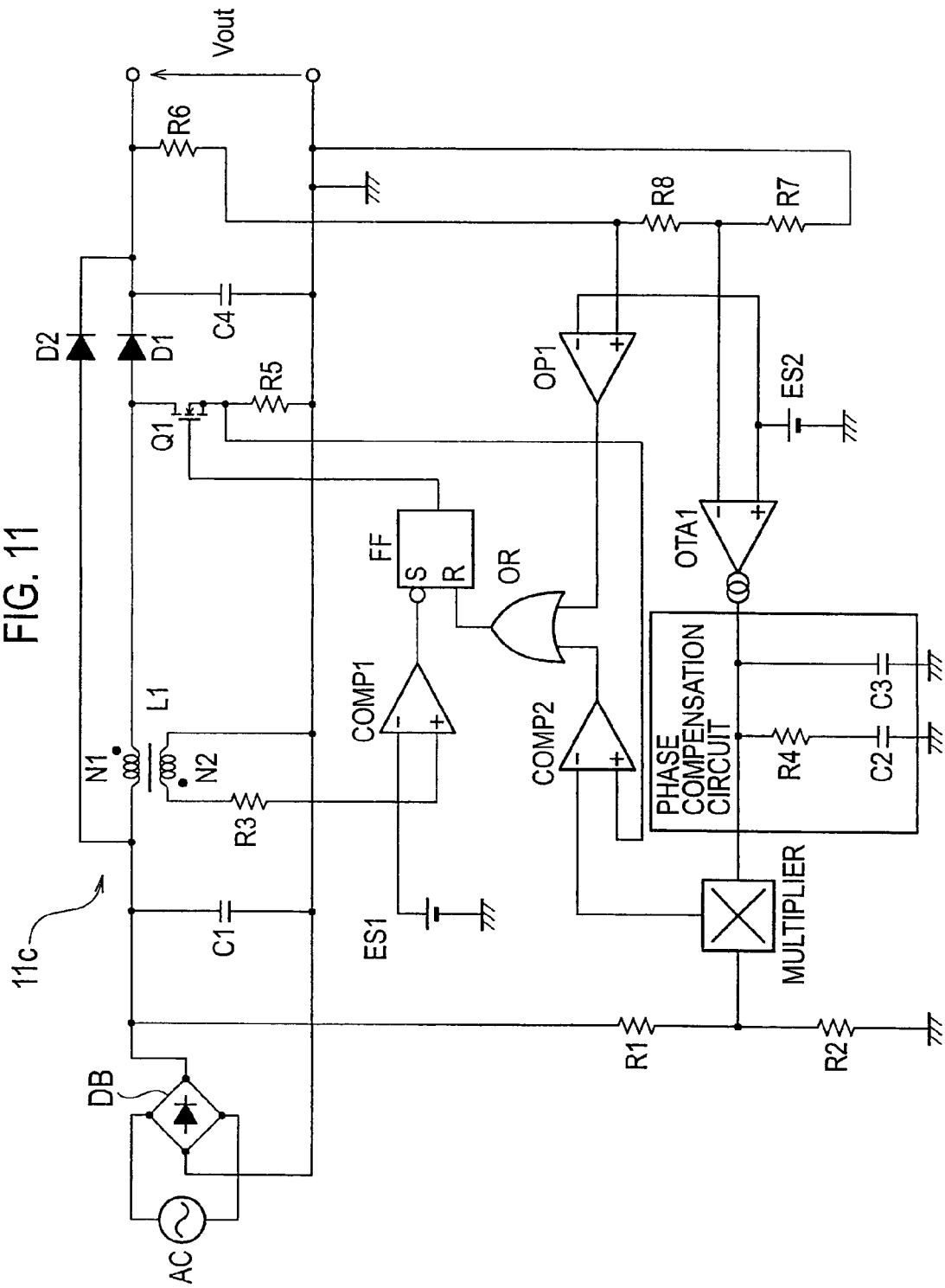
FIG. 11 is a circuitry diagram showing the detailed constitution of a power factor controller used in an AC-DC converter of an eighth embodiment of the present invention.

According to the eighth embodiment of the present invention, the AC-DC converter includes a power factor controller 11c, as shown in FIG. 11. We now describe only the power factor controller 11c.

The power factor controller 11c can be obtained by adding a resistance R8 in between the resistance R6 and the resistance R7 in the output voltage detecting circuit of the power factor controller 11b of the sixth embodiment and further adding an operational amplifier OP1 and an OR circuit OR. Both of the operational amplifier OP1 and the OR circuit OR correspond to the high-speed responsive output voltage detecting circuit of the present invention.

In the output voltage detecting circuit, a connection point between the resistance R8 and the resistance R7 is connected to an inverting input terminal (−) of the operational amplifier OTA1. In the high-speed responsive output voltage detecting circuit, a noninverting input terminal (+) of the operational amplifier OP1 is connected to a connection point between the resistance R8 and the resistance R6, while an inverting input terminal (−) of the operational amplifier OP1 is supplied with a reference voltage ES2. The output of the operational amplifier OP1 is fed to the OR circuit OR. Additionally, an output of the comparator COMP2 is also fed to the OR circuit OR. The output of the OR circuit OR is supplied to a reset terminal of the flip-flop FF.

In the above-constructed AC-DC converter of the eighth embodiment, owing to the interposition of the resistance R8 between the resistances R6 and R7, it is carried out to detect a voltage somewhat larger (larger by only a predetermined value) than the output voltage Vout at the operational amplifier OP1 and continuously reset the flip-flop FF. As there is no phase compensating circuit on the output's side of the operational amplifier OP1, the AC-DC converter is capable of responding variations of electrical load at a high speed.

As mentioned above, according to the AC-DC converter of the eighth embodiment, with an addition of the high-speed responsive output voltage detecting circuit in spite of the presence of such a dull output voltage detecting circuit, it is possible to prevent an output voltage from being overshot due to a sudden change of the electrical load.

Finally, it will be understood by those skilled in the art that the foregoing descriptions are nothing but eight embodiments of the disclosed AC-DC converter and therefore, various changes and modifications may be made within the contents of the present invention.

This application is based upon the Japanese Patent Application No. 2007-191182, filed on Jul. 23, 2007, the entire content of which is incorporated by reference herein.

What is claimed is:

1. An AC-DC converter comprising:
   a rectifier for rectifying an alternating current supplied from an AC power source;
   a power factor controller connected to an output side of the rectifier to improve a power factor;
   a DC-DC converter that converts a voltage outputted from the power factor controller to another voltage and outputs either a power or a current limited to a predetermined value;
   a capacitor for storing an energy; and
   a two-way converter having input/output terminals connected to output terminals of the DC-DC converter and other input/output terminals connected to the capacitor to carry out a two-way power conversion.

2. An AC-DC converter comprising:
   a rectifier for rectifying an alternating current supplied from an AC power source;
   a power factor controller connected to an output side of the rectifier to improve a power factor and output either a power or a current limited to a predetermined value;
   a DC-DC converter that converts a voltage outputted from the power factor controller to another voltage;
   a capacitor for storing an energy; and
   a two-way converter having input/output terminals connected to output terminals of the DC-DC converter and other input/output terminals connected to the capacitor to carry out a two-way power conversion.

3. The AC-DC converter of claim 1, wherein
   the DC-DC converter includes an output voltage detecting circuit that detects an output voltage and applies a feedback control on the output voltage with a delay of a predetermined time since a peak load to thereby control the output voltage.

4. The AC-DC converter of claim 2, wherein
   the power factor controller includes an output voltage detecting circuit that detects an output voltage and applies a feedback control on the output voltage with a delay of a predetermined time since a peak load to thereby control the output voltage.

5. The AC-DC converter of claim 3, wherein
   the DC-DC converter includes a high-speed responsive output voltage detecting circuit that detects a voltage higher than the output voltage detected by the output voltage detecting circuit by a predetermined value and carries out a feedback control based on the voltage as a detection result to thereby control the output voltage.

6. The AC-DC converter of claim 4, wherein
   the power factor controller includes a high-speed responsive output voltage detecting circuit that detects a voltage higher than the output voltage detected by the output voltage detecting circuit by a predetermined value and carries out a feedback control based on the voltage as a detection result to thereby control the output voltage.

7. The AC-DC converter of claim 5, wherein
   the voltage detected by the output voltage detecting circuit has a lowest value,
   the feedback control is applied on the voltage having the lowest value with the delay of the predetermined time since the peak load,
   the voltage detected by the high-speed responsive output voltage detecting circuit has a value higher than the voltage detected by the output voltage detecting circuit, and
   the feedback control is applied on the voltage detected by the high-speed responsive output voltage detecting circuit, in advance of the delay of the output voltage detecting circuit.

8. The AC-DC converter of claim 6, wherein
   the voltage detected by the output voltage detecting circuit has a lowest value,
   the feedback control is applied on the voltage having the lowest value with the delay of the predetermined time since the peak load,
   the voltage detected by the high-speed responsive output voltage detecting circuit has a value higher than the voltage detected by the output voltage detecting circuit, and
   the feedback control is applied on the voltage detected by the high-speed responsive output voltage detecting circuit, in advance of the delay of the output voltage detecting circuit.

9. The AC-DC converter of claim 1, further comprising a capacitor connected to the output terminals of the DC-DC converter.

10. The AC-DC converter of claim 2, further comprising a capacitor connected to the output terminals of the DC-DC converter.

* * * * *